United States Patent [19]
Broad

[11] 3,913,210
[45] Oct. 21, 1975

[54] FABRICATED CELLULAR BODY AND METHOD FOR ASSEMBLING SAID BODY

[75] Inventor: Michael Charles Broad, London, England

[73] Assignee: Microcomb Structures Limited, Hadzor, near Droitwich, England

[22] Filed: Dec. 21, 1973

[21] Appl. No.: 427,226

Related U.S. Application Data

[63] Continuation of Ser. No. 258,790, June 1, 1972, abandoned.

[52] U.S. Cl. .............................. 29/455; 29/471.1
[51] Int. Cl.² .................. B21D 39/00; B23K 31/02
[58] Field of Search ............... 29/455, 502, 471.1; 161/68

[56] References Cited
UNITED STATES PATENTS
3,091,845  6/1963  Herman ............................ 29/502 X
3,389,451  6/1968  Speca ............................. 29/471.1 X OTHER PUBLICATIONS
"Steel" Nov. 18, 1957, pp. 153–156, article titled Photoetching Forms Thin Parts.

Primary Examiner—Al Lawrence Smith
Assistant Examiner—Margaret M. Joyce
Attorney, Agent, or Firm—Darby & Darby

[57] ABSTRACT

The present invention relates to a fabricated cellular structure and the method for assembling it, which method comprises forming a number of flat sheet metal elements to appropriate size and shape by a chemical blanking process and, after deforming the flat sheet metal elements to appropriate nonplanar shape if necessary assembling the elements into a cellular array to form said body, the position of each element in the array being predetermined and dependant upon its pre-designed size and shape. The edge of the elements, which coincide with the body envelope are preferably slotted so that intersecting elements can inter-fit with one another where the elements are coated with a brazing medium, heating of the assembled array of elements in a controlled atmosphere serves to unite the elements to one another.

16 Claims, 6 Drawing Figures

3,913,210

FABRICATED CELLULAR BODY AND METHOD FOR ASSEMBLING SAID BODY

This is a continuation, Ser. No. 258,790, filed June 1, 1972, now abandoned.

BACKGROUND OF THE INVENTION

This invention relates to metallic bodies of fabricated cellular formation and to articles incorporating such bodies as cores or other structural elements.

An example of an article incorporating a core of fabricated cellular formation is a fin or other aerofoil, as used in aircraft and airborne missiles, where a combination of strength and light weight is required. Another example of the use of a body of fabricated cellular formation is in the structure of a so-called honeycomb seal, for instance a radial or flat-faced annular seal for use in a gas turbine.

The expression "fabricated cellular formation" as used herein means a formation in which the cells are produced by bringing appropriately contoured elements into juxtaposition, as distinct from cellular bodies formed by removing appropriately shaped portions from initially noncellular masses, or by moulding, or by blowing operations.

For an aerofoil incorporating a fabricated cellular core in a closely fitting skin, the exterior of the core needs to be accurately shaped to conform to an envelope of specially determined contour, surfacial configuration and profile, usually tapering to at least one feather edge. Such a core has been formed of very thin heat-resisting metal, for instance stainless steel about 0.0015 inch or 0.002 inch thick. The core may be described as being a plate-like element, by which is meant a substantially flat element having any requisite peripheral configuration and a superficial area on each of an upper and a lower side which is considerably greater than the area of its peripheral edge. In addition to its surfacial shape, as dictated by aerodynamic considerations, such a core may be required to exhibit surfacial recesses, corners, steps and other local configurations dependent upon the particular circumstances in which it is to be used.

A well known method of machining a body such as a light-weight plate-like cellular core for an aerofoil is by electrical discharge machining, sometimes referred to as spark-erosion, which is complicated, expensive in terms of equipment and labour costs, and subject to limitations e.g. uneven stressing, which render it not always entirely effective. Moreover, when a cellular core is fabricated from appropriately profiled strips strongly spot welded together, the core may not be a sufficiently rigid and secure mass to withstand handling during electrical discharge machining, and it may be desirable to effect brazing with appropriate material in a controlled atmosphere. In addition, unless the spot welding is most carefully controlled, breaks may occur in the welds within an undesirably short period.

Honeycomb seals, as above mentioned, for use in gas turbines and other situation, have known advantages; for instance the contact areas of the cellular structures are automatically displaceable to provide correct clearance, the seals are light in weight, and cooling capabilities are inherent in the honeycomb structure. It has been proposed to make annular seals by bending a cellular structure, but this presents the problem of fixing where the free ends of the structure meet, and, when the initial structure is a rectangular section strip, there is a tendency for the or each annular surface to become distorted to the form of an anticlastic curve.

SUMMARY OF THE INVENTION

An object of this invention is to provide a form, and method of manufacture, of a metallic fabricated cellular body whereby, when the body is a plate-like core for an aerofoil, at least some of the above mentioned disadvantages are eliminated.

Another object of the invention is to provide a metallic fabricated cellular body which, when in the form of an annular seal, will not exhibit the last mentioned disadvantages.

Hereinafter there are reference to "chemical blanking" as a known process of producing accurately dimensioned and peripherally contoured flat elements from metal sheet. By chemical blanking is meant a process as follows. The shape to be obtained is outlined on paper or other suitable material and the figure so formed is transferred to a metal sheet by a method which provides thereon an acid-resistant surface in which the bare metal is exposed along the outline. Thereafter an element of the required shape and size is separated from the metal sheet by acid etching to etch away the metal exposed along the outline.

In accordance with the invention, there is provided a method of manufacturing a fabricated cellular body by fabricating sheet metal elements and assembling them as an array with each element in a predetermined position to form said body, comprising the fabricating steps of forming each sheet metal element by a chemical blanking process as a flat member having a shape and size determined by its said predetermined position, and comprising the assembly steps of disposing each of said elements in its predetermined position with and intersecting other of said elements to form the cells of said array, and fixedly locating said elements to one another in their predetermined assembled said positions.

BRIEF DESCRIPTION OF DRAWINGS

By way of example, an elementary plate-like body in accordance with the last mentioned aspect of the invention is described hereinafter with reference to the accompanying diagrammatic drawings, wherein.

DESCRIPTION OF PREFERRED EMBODIMENTS

Figure 1:
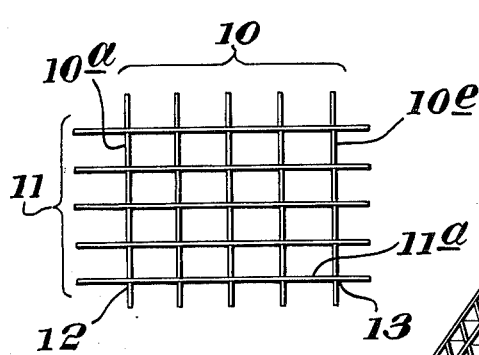
FIG. 1 represents a plan view of a plate-like body formed with rectangular cells.

Referring to FIG. 1, the body is substantially rectangular in plan and is formed of two sets of rigid flat strips, the strips of one set 10 being parallel to one another and uniformly spaced apart, and the strips of the other set 11 being also parallel to one another and uniformly spaced apart and extending at right angles to the first set 10. Each strip of one set 10 intersects all the strips of the other set 11, and the strips are slotted, as described below, and fitted together to define an array of rectangular cells. The dimension of the slots and strips and the manner of interfitting them are such that, in FIG. 2, the upper and lower longer boundary edges of the strips are at respectively the upper and lower boundary surfaces of the envelope in which the body would be a close fit.

Figure 2:
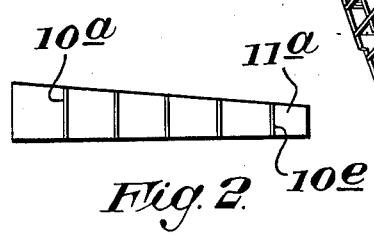
FIG. 2 is a side elevation of the body.

As represented in FIG. 2, the envelope shape of the body tapers uniformly from the left hand side of the figure. The strips of set 11 are similarly tapered and all have the same shape and dimensions as represented for strip 11a in FIG. 3. The strips of the other set 10 are rectangular, but their widths progressively decrease from the widest strip 10a at the left hand in FIGS. 1 and 2, to the narrowest strip 10e at the right hand in those figures. It will be noted that at each position of intersection, for instance at each position 12, 13, the intersecting strips have the same width; thus at intersection 12 the strips 10a, 11a are of the same width and at intersection 13 the strips 10e 11a are of another smaller width.

Figure 4:
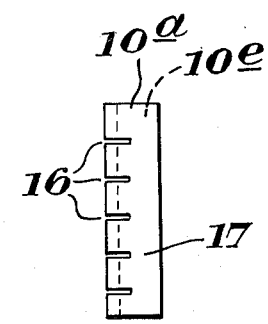
FIG. 4 is a side view of another element extending at right angles, to the element shown in FIG. 3
Figure 3:
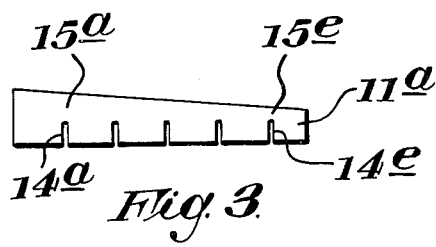
FIG. 3 is a side view of one element of the body.

Referring to FIG. 3, the strip 11a and each other strip of set 11, has slots 14 of equal length extending parallel to one another from the lower edge of the strip. Beyond the inner end of slot 14a, adjacent the wider end of strip 11a, the unslotted part 15a has a bigger dimension than the unslotted part 15e beyond the inner end of the slot 14e adjacent the narrower end of strip 11a, because of the taper form of the strip 11a. As represented by strip 10a in FIG. 4, each strip of set 10 has slots 16 of equal length extending parallel to one another from the upper edge of the strip, but the slots 16 of the widest strip 10a are longer than the slots of the narrowest strip 10E, the width of which is indicated in FIG. 4. The width of the un-slotted part 17 (FIG. 4) of each strip of set 10 is equal to the lengths of the slots 14a–14e of each strip of set 11. In a strip of set 10 the depth of the slots 16 is equal to the width of the unslotted parts of the strips of the set 11 at the positions of intersection of the strips of set 11 with that strip of set 10. For instance, the depth of the slots 16 of strip 10a is equal to the width of the unslotted part 15a adjacent to the slot 14a near the wider end of each strip of set 11, and the depth of the slots of strip 10e is equal to the smaller width of the unslotted part 15e adjacent to the slot 14e near the narrow end of each strip of set 11.

Figure 5:
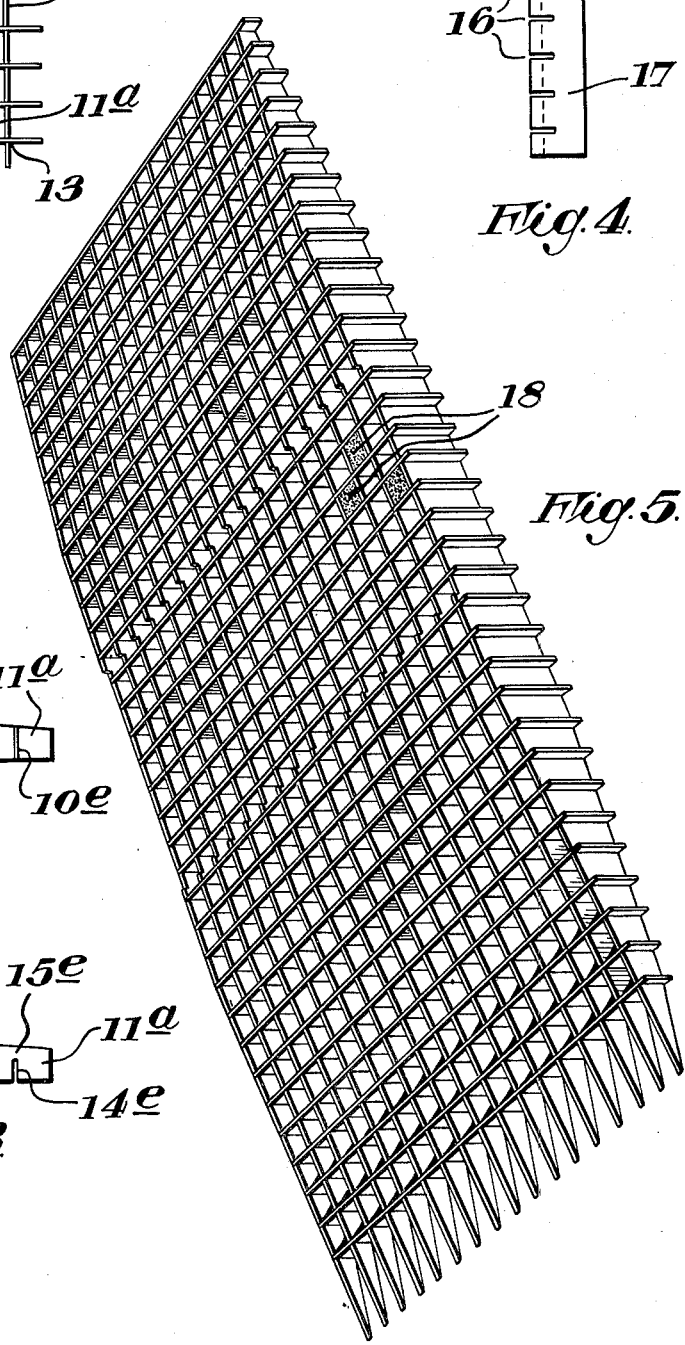
FIG. 5 shows a plate-like profiled body

FIG. 5 shows, by way of example, a typical plate-like profiled body, wherein solid slugs of metal 18 have been dropped into some of the cells to give local reinforcement.

The relation between the lengths of the slots and the widths of the unslotted parts of the strips can be described as being such that at each position of intersection of two strips the sum of the lengths of the slots in the strips is equal to the widths of the strips, which are equal to one another, at the intersection.

The above described relations between the widths of the unslotted parts of the strips and the lengths of the slots enables them to be put together, as indicated in FIGS. 1 and 2, into interlocking engagements to form a body of fabricated cellular form, having rectangular cells defined by the strips, with, as shown in FIG. 2, the upper edges of the strips in a plane which is the top of envelope shape of the body and the lower edges of the strips in a plane which is the bottom of the envelope shape.

Each strip, which may be of stainless steel of thickness 0.0015 inch or 0.002 inch, can be made by chemical blanking as above described, with the precise shape and requisite arrangement of slots as determined by the position it has to occupy in the body. The shape of the body illustrated in FIGS. 1 and 2 is such that all the strips of set 10 have the same shape and dimensions, but where the body is a plate-like core for an aerofoil the contours of the envelope shape of the body may be such that a wide variety of strip shapes and sizes may be required and in some cases each strip may be different from all the other strips.

The widths of the slots will in general be substantially the same as the thickness of the strips so that, in the case of strips extending at right angles to one another, each strip can be inserted into fixed relationship with another, giving a firm cruciform figuration at the intersection of the strips. This provides for the formation of four-sided rectangular cells which may be square or oblong as determined by the spacing of the slots. It will be appreciated that by a similar process an array of lozenge or trapezium shape cells may be obtained. Also, by an appropriate arrangement of strips, tri-angular shape cells may be obtained.

In a plate-like core construction for an aerofoil, the strips can be so arranged that the cell sizes and/or shapes vary from point to point so that for instance where rigidity is less important than weight reduction, a large cell size may be employed, and in parts where rigidity and/or detailed shaping is most important, for example in the boundary regions of a missile fin, the cell sizes may be reduced.

The strips of a fabricated cellular body constructed as above described may be spot welded together at some or all positions of intersection but it is preferred to unite them by an improved method, as described below, because spot welded joints may not be sufficiently reliable for all purposes.

By the improved method, the strips may be formed from sheets metal coated with a thin e.g. 0.0001 inch, covering of nickel. After assembly, the core is heated, in a furnace in a vacuum or other non-oxidising atmosphere, to cause the nickel to flow and create intimate metal to metal junctions between the strips at the intersections. The resultant cellular body will be very strong and present a clean and neat appearance. Other suitable brazing media may be employed.

In previously proposed methods of manufacturing an aerofoil, for instance a missile fin, comprising a frame covered for most of its surface with a skin of light weight metal sheet or film two portions of skin meeting at an edge of the fin have required to be united, by crimping or otherwise, resulting in a double thickness of the material of the skin. This has presented a weight problem, because at the speeds of operation of airborne missiles any such weight penalty may lead to various problems of an inertial nature when a missile is being maneuvered.

Figure 6:
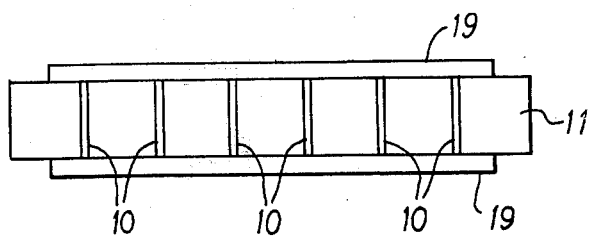
FIG. 6 is a side elevation of another body.

The component strips of a fabricated cellular body in accordance with the invention may be so preformed that they do not extend beyond the envelope shape of the body. However, because the body does not require to be machined to obtain its precise final shape, the strips can be formed with projections or extensions beyond the envelope shape for any desired purpose. For instance, the strips or portions thereof may have extensions or projections on an edge or other boundary region of a plate-like core for an aerofoil to engage in slots in a portion of the skin applied about that edge or other boundary region, so that the skin can be applied without involving a double thickness formation thereof. Thereby also the invention provides an improved structure for mounting an aerofoil on a body, for instance a missile fin on a missile body, in that parts of strips extending through slots in the skin of the aerofoil can be arranged to mate with slots provided in a fin root which is an integral part of the body, to facilitate the formation of a rigid, strong and accurate attachment without a weight penalty imposed by special fixing means which have necessarily been used hitherto.

Where the fabricated cellular body is the core of an aerofoil, the above mentioned nickel brazing method may be extended to unite the metal skin 19 (see FIG. 6) with the core. The skin is nickel coated before being fitted to the core, for instance by the toungue-and slot method above described to locate the skin. Thereafter the whole assembly is heated in an appropriate atmosphere, as above mentioned, to produce a brazed nickel union between the skin and core.

The production of a honeycomb seal in accordance with the invention can be effected as follows. A number of flat washer-like rings, with requisite inner and outer radii, and with radial slots extending from the outer periphery, at required spacing, are produced by chemical blanking Also by chemical blanking are obtained a number of rectangular strips, conveniently of metal of the same thickness as the rings, with slots extending at required spacing from one edge of the strip. The width of the strips is equal to the radial width of the rings, and the length of the slots is half that dimension. The width of the slots is substantially the same as the thickness of the metal. The spacing of the slots is determined by the required dimensions of the cells. For the purpose of illustration it is assumed that the seal is to comprise six flat rings. The number of rectangular strips will be determined by the number of slots in each ring. The seal is not assembled with the six rings co-axial and maintained spaced apart by the rectangular strips presented, in radial planes to the outside of an in edge-to-edge relation with the rings, the strips being pressed into interfitting engagement with the rings, the rings being forced into the slots of the strips and the strips being forced into the slots of the rings, so that the rings and strips intersect to define the cells.

The final construction is a fabricated cellular body of hollow cylindrical envelope shape, with the edges of the rings and strips on the envelope surfaces. A shaft to be sealed can be introduced in the central opening of the seal.

If desired, the interstices formed by the cell construction as viewed from the outer cylindrical surface of the seal can be filled with a suitable material, e.g. thermosetting resin, so that from the outside the finished seal has a solid appearance. However, the inner or sealing surface will touch a shaft which is being sealed, in a manner to give sealing of equal or better quality than obtainable with existing honeycomb seals.

A seal constructed in accordance with the invention will not suffer from distortion or bowing in the manner of existing seals and has no free edges which need to be joined. It provides a highly efficient seal of light weight and simple construction which is easily fitted.

Because the sheet metal elements of a fabricated cellular body constructed in accordance with the invention have their configurations determined before the body is assembled, they can be formed if required with additional characteristics of profile which relate to a particular function of the body. For instance, it may be desirable for the core of an aerofoil to provide for internal movement of fluid, gaseous or liquid, to prevent the establishment of undesirable differential pressures in the core or to facilitate liquid flow where the aerofoil serves as a fluid reservoir or heat-exchanger. Thus some or all of the elements may be formed with holes to provide communication between adjacent cells. It will be apparent that if a fabricated cellular body in accordance with the invention, is employed for example within the said body may be settled at the design stage, and simply introduced by means of the said holes in the elements; the elements may be left unperforated where the passage of fluids is not desired. Also, the speed of flow of said fluids may be controlled by varying the size of the perforations.

A separate pathway or pathways may, if desired be fed with super-atmospheric pressure air which may be allowed to encroach upon the main fluid pathways at selected points, in a sense to divert or accelerate the movement of said main fluid.

A fabricated cellular formation according to the present invention is substantially stress-free this providing great security against fractures and strains in the finished structure.

It will be understood that the above description of the present invention is susceptible to various modifications, changes and adaptations.

I claim:

1. A method of manufacturing a fabricated cellular body of predetermined configuration provided be an array of flat sheet elements each occupying an intended position and intersecting other elements at pre-intended intersections to provide said body of predetermined configuration with opposite faces of larger superficial area in plan view than the area in side elevation of the perimeter of said body and with at least one of said opposite faces of non-planar form, said method comprising the steps of:

i. forming each of said flat sheet elements by chemical blanking
      a. with at least one slot therein through a portion of the width of the element for enabling said pre-intended intersections of the elements of the array to be effected, and
      b. with a predetermined outline shape and size according to the intended position thereof in the array and such that subsequent shaping of each element and of the assembled area to form said predetermined configuration of the body is unnecessary;

ii. assembling the formed flat sheet elements in their intended array positions with said slots in mutual interengagement at said intended intersections; and iii. securing the intersecting flat sheet elements of the assembled array in said positions relative to one another.

2. A method as claimed in claim 1, wherein said flat sheet elements are coated with a brazing medium, and wherein said step of securing the intersecting flat sheet elements in their assembled array positions comprises heating said assembled elements in a controlled atmosphere to cause the medium to unite said elements.

3. A cellular structure comprising first and second sets of flat pieces of material, each of the said pieces of the said first and second sets occupying a predetermined position and having a chemically blanked form defining a pre-shaped outline therefor appropriate to its said predetermined position and at least one slot partially through its width at a predetermined location, the pieces of the said first set and of the said second set being arranged in said predetermined positions so that the slots thereof interlock to form the cellular structure with a predetermined configuration having opposite faces of larger superficial area in plan view than the area in side elevation of the perimeter of the body and with at least one of said opposite faces of non-planar form, and means joining said pieces of said first and second sets together.

4. A cellular structure as in claim 3 further comprising solid material disposed in certain of the cells and engaging the walls of the respective pieces of said first and second sets of pieces forming said certain cells to strengthen the structure.

5. A cellular structure as in claim 3 wherein said pieces of said first set are aligned generally parallel to each other in a first direction, and the pieces of said second set are aligned generally orthogonal to said first direction.

6. A cellular structure as in claim 3 wherein said means for joining the pieces of the two sets together comprises a coating material on said pieces with the portions of the coating material adjacent the slots of the pieces of the two sets being brazed to form a bond.

7. A cellular structure as in claim 3 further comprising a skin bonded to the outside of said cellular structure.

8. A cellular structure as in claim 6 further comprising a skin bonded to the outside of said cellular structure by the coating material.

9. A method of manufacturing a fabricated cellular body of predetermined configuration provided by an array of flat sheet elements each occupying an intended position and intersecting other elements at preintended intersections, said method comprising the steps of:
  i. forming each of said flat sheet elements by chemical blanking
    a. With at least one slot therein through a portion of the width of the element for enabling said pre-intended intersections of the elements of the array to be effected, and
    b. with a predetermined outline shape and size according to the intended position thereof in the array and such that subsequent shaping of each element and of the assembled array to form said predetermined configuration of the body is unnecessary, the outline shape of selected ones of said elements being so formed as to provide a nonuniform width between adjacent slots thereof whereby said predetermined configuration of the body is one having a correspondingly non-uniform dimension at the intended positions of said selected elements;
  iii. assembling the formed flat sheet elements in their intended array positions with said slots in mutual interengagement at said intended intersections; and
  iii. securing the intersecting flat sheet elements of the assembled array in said positions relative to one another.

10. A method as claimed in claim 9, wherein said flat sheet elements are coated with a brazing medium, and wherein said step of securing the intersecting flat sheet elements in their assembled array positions comprises heating said assembled elements in a controlled atmosphere to cause the medium to unite said elements.

11. A cellular structure composed of first and second sets of flat pieces of material, each of said pieces occupying a predetermined position and having a chemically blanked form defining a preshaped outline therefor appropriate to its said predetermined position and at least one slot partially through its width at a predetermined location, at least some of the pieces of at least one of said sets being of varying width along a selected portion of the length thereof remote from a said slot therein; wherein the pieces of said first and second sets are respectively arranged in said predetermined positions so that the slots thereof interlock to form the cellular structure, and means are provided joining the pieces of said first and second sets together.

12. A cellular structure as claim in claim 11 further comprising a skin bonded to the outside of said cellular structure.

13. A cellular structure as claimed in claim 11, comprising solid material disposed in selected ones of the cells thereof, said solid material engaging the walls of the respective ones of said pieces forming those said cells and serving as reinforcements of those said cells.

14. A cellular structure as claimed in claim 11, wherein said pieces of said first set are aligned generally parallel to one another in a first direction, and the pieces of said second set are aligned generally orthogonal to said first direction.

15. A cellular structure as claimed in claim 11, wherein said pieces are provided with a coating material thereon and said joining means comprises portions of the coating material adjacent the slots of said pieces of the two sets being brazed to form a bond.

16. A cellular structure composed of a first set of flat pieces of material aligned generally parallel to one another in a first direction and a second set of flat pieces of material aligned generally orthogonal to said first direction, wherein each of the pieces of the said first set occupies a predetermined position and has a chemically blanked form of annular shape provided with a plurality of radially directed slots partially through its radial width at respective predetermined locations, each of the pieces of the said second set occupies a predetermined position and has a chemically blanked form defining a pre-shaped outline therefor appropriate to its said predetermined position and at least one slot partially through its width at a predetermined location, the pieces of the first and second sets are arranged in said predetermined positions such that the slots thereof interlock to form the cellular structure with the pieces of said second set extending radially across the pieces of the first set and intersecting the latter orthogonally, and means are provided joining the pieces of said first and second sets together.

* * * * *